United States Patent
Narayan et al.

(10) Patent No.: US 11,991,417 B2
(45) Date of Patent: *May 21, 2024

(54) SYSTEMS AND METHODS FOR INTELLIGENT MEDIA CONTENT SEGMENTATION AND ANALYSIS

(71) Applicant: Disney Enterprises, Inc., Burbank, CA (US)

(72) Inventors: Nimesh Narayan, Los Angeles, CA (US); Jack Luu, Huntington Beach, CA (US); Alan Pao, Santa Monica, CA (US); Matthew C. Petrillo, Sandy Hook, CT (US); Anthony M. Accardo, Los Angeles, CA (US); Alexis J. Lindquist, Los Angeles, CA (US); Miquel Angel Farre Guiu, Bern (CH); Katharine (Kaki) S. Ettinger, Santa Monica, CA (US); Lena Volodarsky Bareket, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,369

(22) Filed: Nov. 30, 2022

(65) Prior Publication Data
US 2023/0092847 A1    Mar. 23, 2023

Related U.S. Application Data

(63) Continuation of application No. 15/199,677, filed on Jun. 30, 2016, now Pat. No. 11,523,188.

(51) Int. Cl.
*H04N 21/472* (2011.01)
*G06V 20/40* (2022.01)
(Continued)

(52) U.S. Cl.
CPC ....... *H04N 21/47205* (2013.01); *G06V 20/49* (2022.01); *G11B 27/28* (2013.01); *H04N 21/8133* (2013.01); *H04N 21/8456* (2013.01)

(58) Field of Classification Search
CPC ......... H04N 21/47205; H04N 21/8133; H04N 21/8456; G06V 20/49; G11B 27/28
(Continued)

(56) References Cited

U.S. PATENT DOCUMENTS

| 8,942,542 B1* | 1/2015 | Sherrets | H04N 21/8456 386/290 |
| 2009/0083790 A1* | 3/2009 | Wang | G11B 27/28 725/38 |
| 2009/0310932 A1* | 12/2009 | Hsieh | G11B 27/034 386/280 |

\* cited by examiner

*Primary Examiner* — Thai Q Tran
*Assistant Examiner* — Nienru Yang
(74) *Attorney, Agent, or Firm* — Farjami & Farjami LLP

(57) ABSTRACT

There is provided a system including a non-transitory memory storing an executable code and a hardware processor executing the executable code to receive a media content including a plurality of frames, divide the media content into a plurality of shots, each of the plurality of shots including a plurality of frames of the media content based on a first similarity between the plurality of frames, determine a plurality of sequential shots of the plurality of shots to be part of a first sub-scene of a plurality of sub-scenes of a scene based on a timeline continuity of the plurality of sequential shots, identify each of the plurality of shots of the media content and each of the plurality of sub-scenes with a corresponding beginning time code and a corresponding ending time code.

20 Claims, 4 Drawing Sheets

(51) Int. Cl.
*G11B 27/28* (2006.01)
*H04N 21/81* (2011.01)
*H04N 21/845* (2011.01)

(58) Field of Classification Search
USPC .......................................... 386/241
See application file for complete search history.

SYSTEMS AND METHODS FOR INTELLIGENT MEDIA CONTENT SEGMENTATION AND ANALYSIS

The present application is a Continuation of U.S. application Ser. No. 15/199,677, filed Jun. 30, 2016.

BACKGROUND

Typical video programs, such as television shows and movies, include a number of different video shots and scenes shown in sequence, the content of which may be processed using video content analysis. Conventional video content analysis may be utilized to identify motion in a video, recognize objects and/or shapes in a video, and track an object or a person in a video.

SUMMARY

The present disclosure is directed to systems and methods for intelligent media content segmentation and analysis, substantially as shown in and/or described in connection with at least one of the figures, as set forth more completely in the claims.

DETAILED DESCRIPTION

Figure 1:
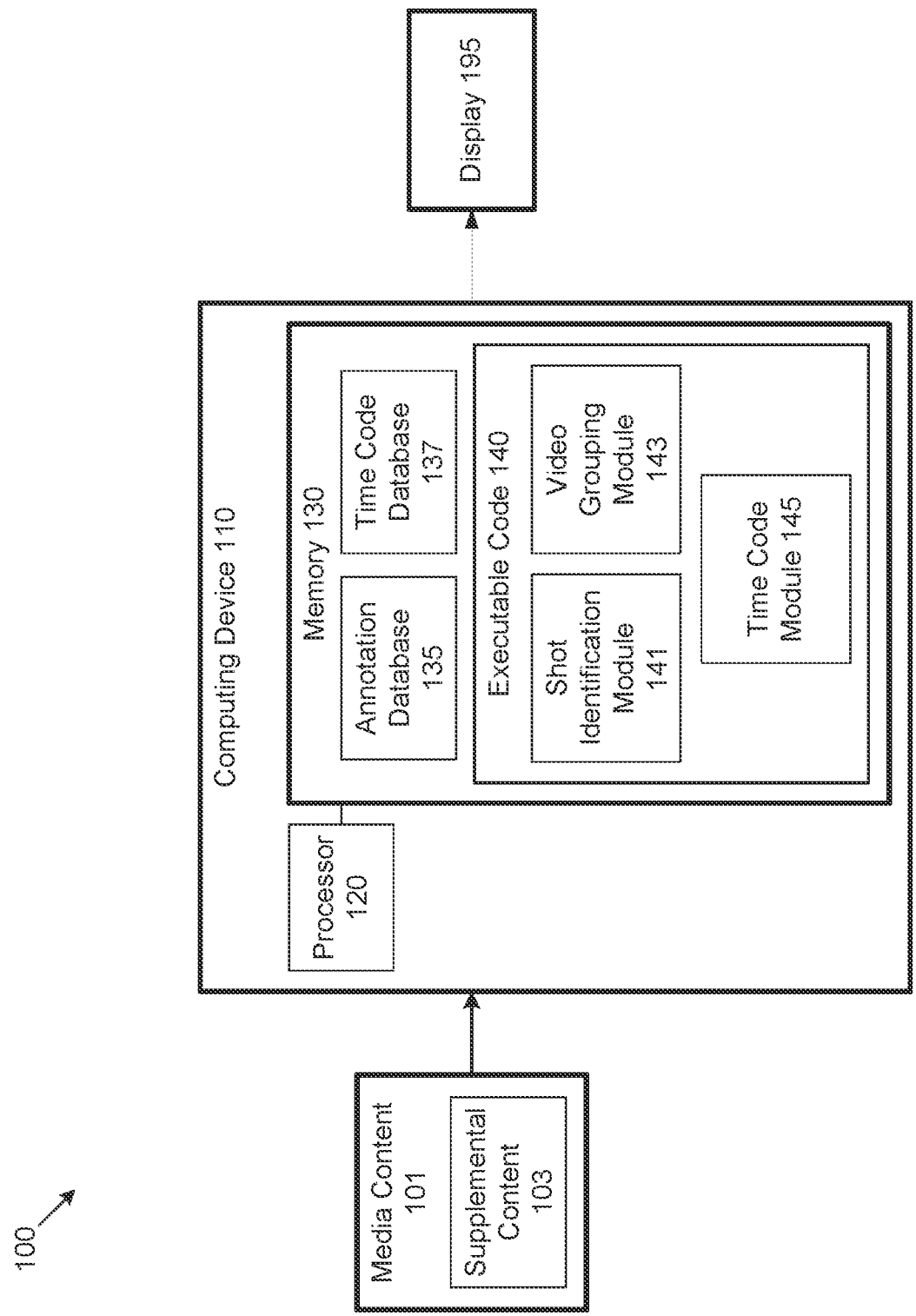
FIG. 1 illustrates a diagram of an exemplary system for media content segmentation and analysis, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a diagram of an exemplary system for media content segmentation and analysis, according to one implementation of the present disclosure. System 100 includes media content 101, computing device 110, and display 195. Media content 101 may be a video content, such as a television show, a movie, etc., and may include a plurality of frames of video content. In some implementations, media content 101 may include a video content, an audio content, etc. As shown in FIG. 1, media content 101 includes supplemental content 103. Supplemental content 103 may include audio and/or video content that may supplement media content 101. For example, supplemental content 103 may include closed captioning content for media content 101, or supplemental content 103 may include information about media content 101, such as character information, information related to the creation of media content 101, or other supplemental information related to media content 101.

Computing device 110 includes processor 120 and memory 130. Processor 120 is a hardware processor, such as a central processing unit (CPU), used in computing device 110. Memory 130 is a non-transitory storage device for storing computer code for execution by processor 120, and also for storing various data and parameters. Memory 130 includes annotation database 135 and executable code 140. Annotation database 135 is a database for storing information related to media content 101. In some implementations, annotation database may include annotations related to one or more of the plurality of frames of media content 101. Annotations may also include notes, labels, categories, and/or other information related to sub-scenes of media content 101, scenes of media content 101, acts of media content 101, etc. In some implementations, a user may manually enter annotations stored in annotation database 135. In other implementations, annotations may be automatically entered in annotation database 135, for example, by executable code 140.

Time code database 137 is a database for storing beginning time codes and ending time codes of shots, sub-scenes, and scenes of media content 101. In some implementations, time code database 137 may store the beginning time codes and ending time codes for each shot in media content 101, and may include a record of shots that combine to make a sub-scene and/or scene of media content 101. In other implementations, time code database may include a record for the beginning time code and/or ending time code for each shot in media content 101, a record for the beginning time code and/or ending time code for each sub-scene in media content 101, a record for the beginning time code and/or ending time code for each scene in media content 101, etc.

Executable code 140 may include one or more software modules stored in memory 130 for execution by processor 120 of computing device 110. As shown in FIG. 1, executable code 140 includes shot identification module 141 and video grouping module 143. Shot identification module 141 is a software module stored in memory 130 for execution by processor 120 to identify shots in media content 101. A shot is a segment of media content 101 that includes a plurality of frames, which may be a plurality of sequential frames. Shots may include a plurality of frames that share a similarity. In some implementations, the similarity may be that the frames show the same character, depict the same setting, share a common theme, etc.

Video grouping module 143 is a software module stored in memory 130 for execution by processor 120 to group shots of media content 101. In some implementations, video grouping module 143 may combine sequential shots to form one or more sub-scenes. A sub-scene may be a grouping of sequential shots of media content 101. Each shot in the sub-scene may include one or more same characters, may take place in the same location or setting, may share a common theme, etc. In some implementations, a sub-scene may not convey an entire narrative idea and may rely on the context provided by a preceding shot in the same scene and/or a succeeding shot in the same scene to convey the narrative meaning of the sub-scene. In other implementations, a single sub-scene may constitute a scene, in which case the sub-scene does convey a complete narrative idea and does not rely on other sub-scenes for context.

Video grouping module 143 may group sequential sub-scenes of media content 101 together to form a scenes. A scene may be a segment of media content 101 that constitutes a single narrative idea that can stand on its own. Scenes may be comprised of one or more sub-scenes. In some implementations, video grouping module 143 may combine one or more scenes together to make an act, where an act may include a major portion of media content 101. For example, an act of a television show may run from the beginning of the show to the first commercial break, form one commercial break to the next commercial break, or from the last commercial break to the end of the show.

In some implementations, video grouping module 143 may group shots to form sub-scenes and/or sub-scenes to form scenes based on a style associated with media content 101. For example, certain television programs use a distinct style. Accordingly, video grouping module 143 may be configured to group shots to form sub-scenes and/or sub-scenes to form scenes consistent with the style of media content 101. In other implementations, video grouping module 143 may group shots to form sub-scenes and/or sub-scenes to form scenes based on a genre of media content 101. For example, if media content 101 is a drama, media content 101 may tend to include more montages that cut back and forth between different settings, whereas if media content 101 is a comedy, media content 101 may tend to include scenes and/or episodes that take place in one room or a small number of rooms. Various genres may have different styles governing video grouping module 143.

Time code module 145 is a software module stored in memory 130 for execution by processor 120 to record beginning time codes and/or ending time codes corresponding to each shot, sub-scene, and/or scene of media content 101. In some implementations, time code module 145 may record the beginning time code and/or ending time code in time code database 137. The beginning and/or ending time code may be used to play back one or more shots of media content 101. Display 195 is a display for displaying media content 101 and supplementary content 103. Display 195 may be a television, a computer monitor, a tablet computer, a mobile device, etc.

Figure 2:
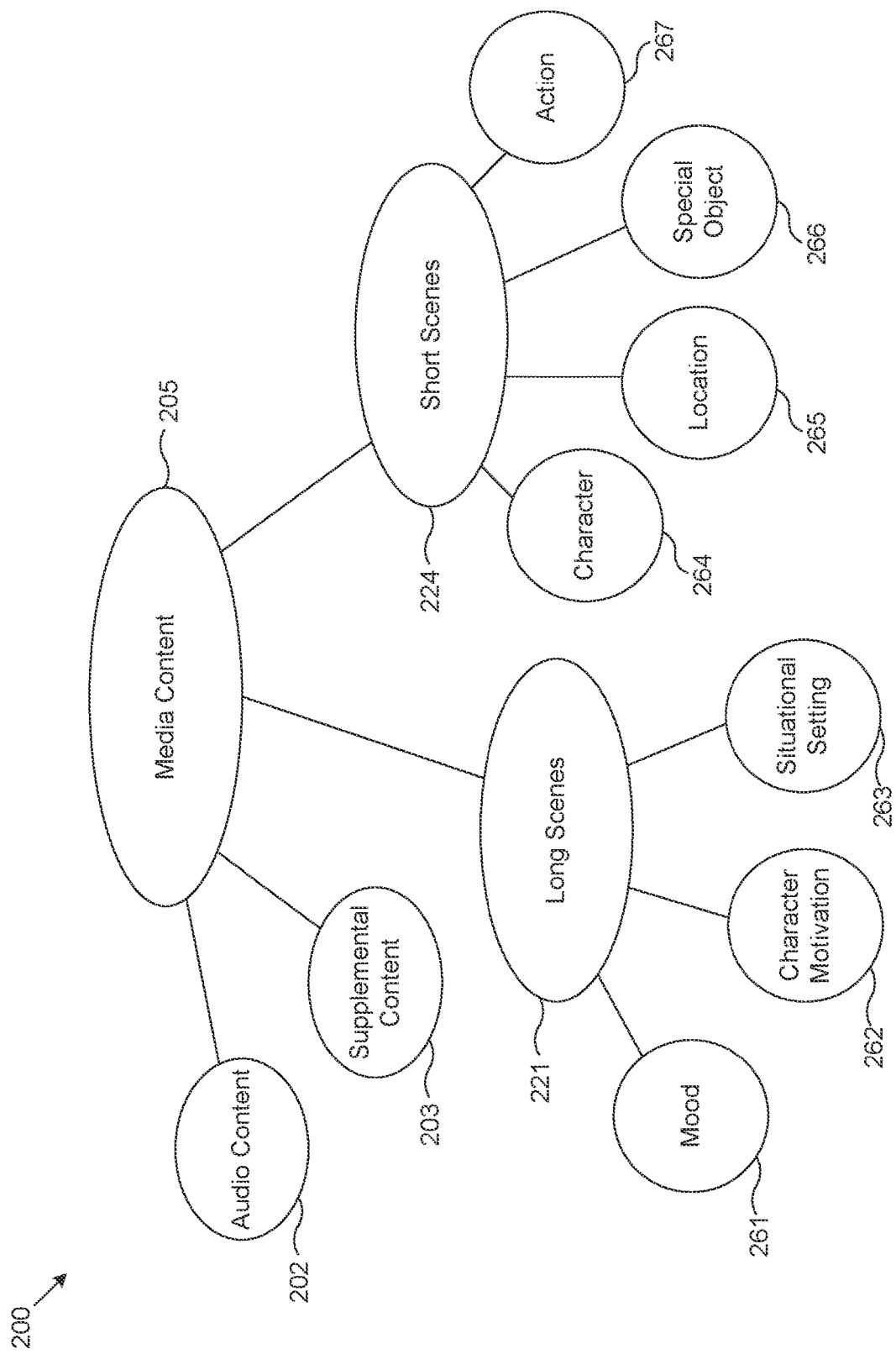
FIG. 2 illustrates a diagram of an exemplary media content hierarchy tree, according to one implementation of the present disclosure.

FIG. 2 illustrates a diagram of an exemplary media content hierarchy tree; according to one implementation of the present disclosure. Diagram 200 shows media content 205 which includes audio content 202, supplemental content 203, long scenes 221, and short scenes 224. Long scenes 221 may include one or more shots and/or sub-scenes that combine to create a connection that defines the long scene. Long scenes 221 may be made up of a plurality of shots and/or sub-scenes that create connection such as mood 261, character motivation 262, or situational setting 263. Mood 261 may include a plurality of shots and/or sub-scenes to elicit a response from a viewer of media content 101. For example, the plurality of shots and/or sub-scenes in the scene may cause a viewer to feel, for example, amused, cheerful, or sentimental, or the plurality of shots and/or sub-scenes in the scene may cause the viewer to feel, for example, apprehensive, depressed, or pessimistic.

In other implementations, long scenes 221 may include a plurality of shots and/or sub-scenes that may provide background or foundational information about media content 101, such as character motivation 262. Character motivation 262 may include a plurality of shots and/or sub-scenes to explain a storyline in media content 101. Situational setting 263 may include a plurality of shots and/or sub-scenes that are connected by a situation and/or setting of media content 101. Short scenes 224 may include one or more shots and/or sub-scenes that combine to create a connection that defines the short scene. Themes and connections between shots and/or sub-scenes that make up short scenes are simpler than connections in long scenes. Shots and/or sub-scenes combining to make up a short scene may have character 264 in common, location 265 in common, special object 266 in common, or action 267 in common.

Figure 3:
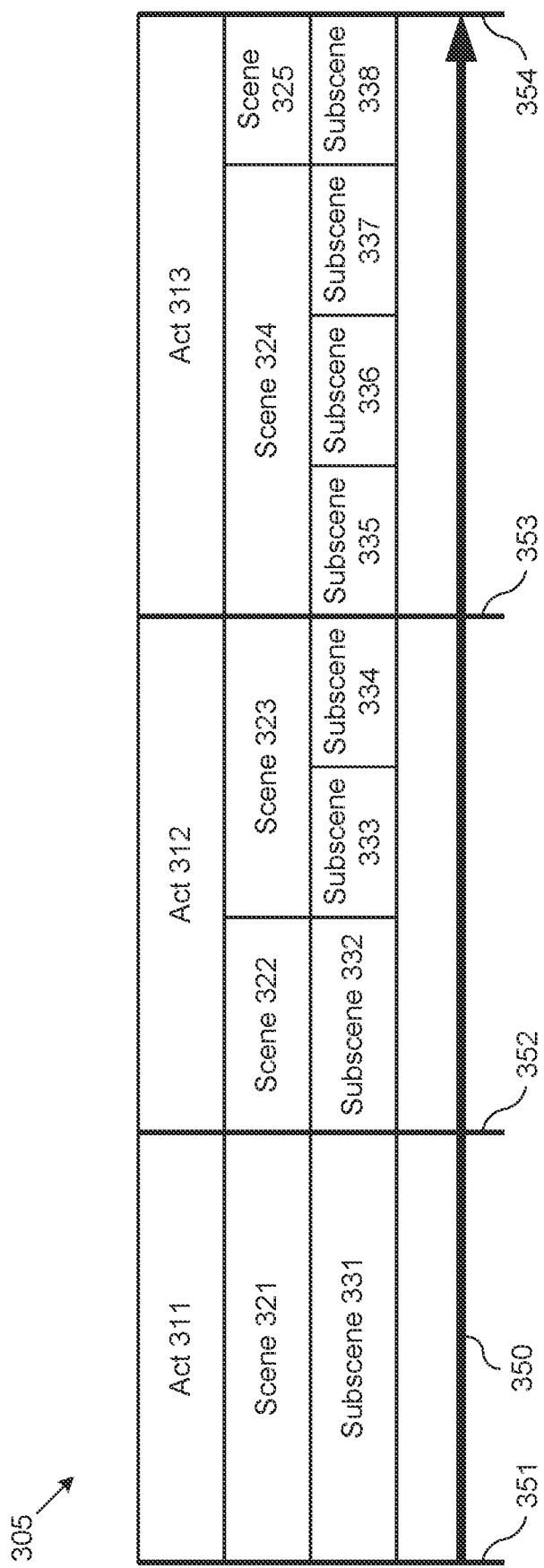
FIG. 3 illustrates a diagram of an exemplary segmented media content, according to one implementation of the present disclosure.

FIG. 3 illustrates a diagram of an exemplary segment media content, according to one implementation of the present disclosure. Media Content 305 includes a hierarchy of segments, including act 311, act 312, and act 313. Each act of media content 305 is bounded by a transition. In some implementations, the transition may be the beginning or end of media content 305, such as the beginning or end of a television program. Other transitions that may be used to bound an act include commercial breaks, as indicated by transition 352, which is shown as a boundary between act 311 with beginning 351 and act 312, and transition 353, which is shown as a boundary between act 312 and act 313 with ending 354. Act 311 includes scene 321. Scene 321 is an example of a scene that includes only one sub-scene, specifically, sub-scene 331. Additionally, scene 321 makes up all of act 311.

Act 312 includes scene 322 and scene 323. Scene 322 and scene 323 each include a single narrative idea and do not require a preceding and/or succeeding scene to provide context or information to make sense. Scene 322 includes sub-scene 332, and scene 323 includes sub-scene 333 and sub-scene 334. Sub-scene 333 is a segment of media content 305 that has continuity in time and place, but is a fragment of an idea on its own. Conveying the narrative meaning of sub-scene 333 requires context from succeeding sub-scene 334. Similarly, sub-scene 334 is a segment of media content 305 that has continuity in time and place, but is a fragment of an idea on its own. Conveying the narrative meaning of sub-scene 334 requires context from preceding sub-scene 333.

Figure 4:
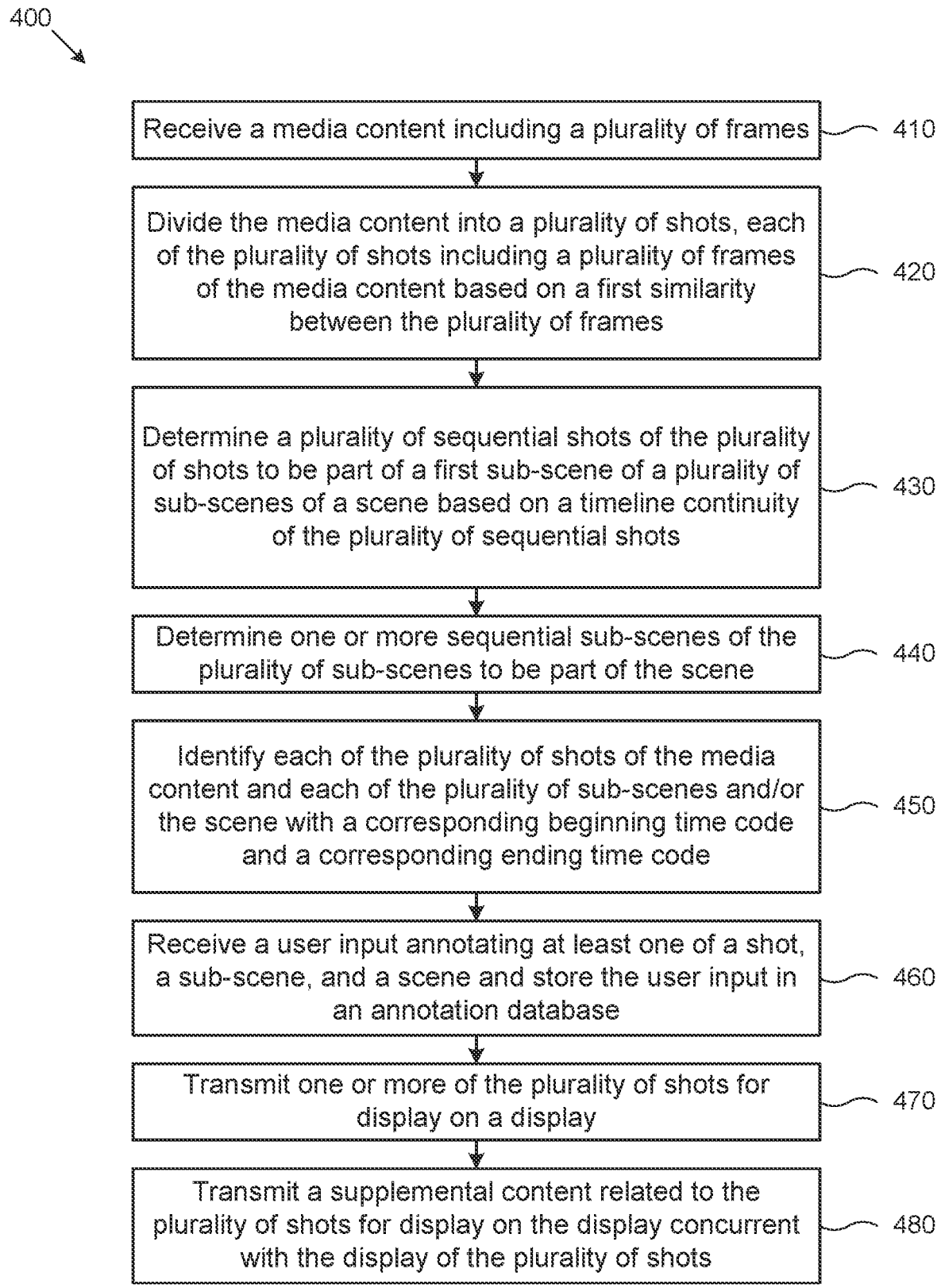
FIG. 4 illustrates a flowchart illustrating an exemplary method of media content segmentation and analysis, according to one implementation of the present disclosure.

FIG. 4 illustrates a flowchart illustrating an exemplary method of media content segmentation and analysis, according to one implementation of the present disclosure. Method 400 begins at 410, where executable code 140 receives media content 101 including a plurality of frames. In some implementations, media content 101 may be a television show, a movie, or other media content including a plurality of video frames. Computing device 110 may receive media content 101 over a wired connection such as over a cable television broadcast, a computer network such as the Internet. or computing device 110 may receive media content 110 over a wireless connection, such as an over-the-air broadcast or a wireless network transmission.

At 420, executable code 140 divides media content 101 into a plurality of shots, each of the plurality of shots including a plurality of frames of media content 101 based on a first similarity between the plurality of frames. In some implementations, executable code 140 may determine the similarity between the plurality of frames using an edit decision list created during production of media content 101. In other implementations, executable code 140 may determine the similarity between the plurality of frames using computer vision. Computer vision may recognize a character that appears in each of the plurality of frames, a setting shown in the plurality of frames, etc. In other implementations, executable code may determine the similarity between the plurality of frames using annotation database 135. For example, annotation database 135 may include annotations describing a theme in each of the plurality of frames, and executable code 140 may determine the plurality of frames constitutes a shot based on the common theme.

At 430, executable code 140 determines a plurality of sequential shots of plurality of shots to be part of a first sub-scene of a plurality of sub-scenes of a scene based on a timeline continuity of the plurality of shots. A sub-scene may be a segment of media content 101 that has continuity in time and place but is a fragment of an idea on its own. Each sub-scene may rely on the context of a preceding sub-scene and/or a succeeding sub-scene to convey the narrative meaning of the sub-scene. Each sub-scene may be comprised of one or more shots. The beginning and/or end of a sub-scene may be indicated by a distinct shift in time, a distinct shift in location, a change in characters, or a change in the narrative framework. For example, media content 101 may include a sequence that shows two characters discussing an event that happened in the past, then cut to a flashback of the event, and then return to the current conversation. Such a sequence includes three sub-scenes: the first showing the current conversation and having continuity in time, characters, and location. The second sub-scene shows the flashback, and is indicated by the change in time and setting form the current conversation. Additionally, the second sub-scene relies on the conversation from the preceding sub-scene for context. The third sub-scene includes the return to the current conversation and includes another shift in time and location from the second sub-scene, returning to the current time of media content 101. In the event that one scene is comprised of only one sub-scene, that sub-scene does convey a complete narrative idea and does not rely on a preceding or succeeding sub-scene from the same scene for context or understanding.

At 440, executable code 140 determines one or more sequential sub-scenes of the plurality of sub-scenes to be part of the scene. A scene is a unit of media content 101 that constitutes a single narrative idea that can stand on its own. Scenes may be comprised of one or more sub-scenes. In some implementations, a scene may take place in a continuous location with a continuous set of characters. For example, a simple scene having only one sub-scene may depict a character proposing marriage to another character at a restaurant. A more complex scene including two sub-scenes may include a sub-scene showing the skyline of a city where the scene takes place followed by a sub-scene showing two characters having a conversation while entering a building in the city.

In other implementations, a scene may be more complex and include a sequence that conveys a single idea and takes place in more than one location and/or involves more than one continuous set of characters. For example, a car chase may include a sequence of shots having different settings as the chase progresses through a city; a training montage may include a plurality of sub-scenes depicting different activities taking place in different locations; a phone call may cut back and forth between callers on either side of the conversation in different locations, etc. An example of a scene including a plurality of sub-scenes may include an establishing shot of the skyline of a city. The next sub-scene may depict two characters on an airplane discussing their respective destinations, followed by a sub-scene showing a dream of one of the characters, such as dreaming of being on a tropical beach, followed by sub-scene showing the dreaming character waking up on the plane next to the other character. Video grouping module 143 may combine the sub-scenes into a scene.

At 450, executable code 140 identifies each of the plurality of shots of media content 101, each of the plurality of sub-scenes of media content 101, and/or each of a plurality of scenes of media content 101 with a corresponding beginning time code and a corresponding ending time code. Shot identification module 141 may record the beginning time code of each shot in media content 101, and store the beginning time code in time code database 137. As video grouping module combines shots to form sub-scenes and scenes, the beginning time code of the first shot in the sub-scene or scene becomes the beginning time code for the sub-scene or scene. Likewise, the ending time code for the final shot in the sub-scene or scene becomes the ending time code for the sub-scene or scene. The beginning time code and ending time code for each shot, sub-scene, and scene may be used as pointers to call on a particular shot, sub-scene, and/or scene. In some implementations, time code module 145 may use the beginning time code and/or ending time code to play back a shot, sub-scene, and/or scene of media content 101.

At 460, executable code 140 receives a user input annotating at least one of a shot, a sub-scene, and a scene and stores the user input in annotation database 135. In some implementations, shots, sub-scenes, and scenes of media content may not include annotations in annotation database 135, such as after each shot, sub-scene, and/or scene is created. A user may input an annotation related to the corresponding shot, sub-scene, and/or scene. For example, an annotation for a shot may indicate the characters depicted in the shot, the location or setting of the shot, a theme of the shot, etc. An annotation for a sub-scene may indicate the information of the constituent shots, and may additionally include an annotation indicating the context of the sub-scene, etc. An annotation for a scene may include the annotations for the constituent sub-scenes, and may additionally include annotations indicating the narrative idea portrayed by the scene, etc.

At 470, executable code 140 transmits one or more of the one or more shots for display on display 195. Executable code 140 may transmit a shot, a plurality of shots, a plurality of sub-scenes, a plurality of scenes, up to the entirely of media content 101. Method 400 continues at 480, where executable code 140 transmits a supplemental content related to the one or more shots for display on the display concurrent with the display of the one or more shots. In some implementations, supplemental information 103 may include closed captioning for media content 101. In other implementations, supplemental information 103 may include other information related to a shot, sub-scene, and/or scene of media content 101. For example, supplemental information 103 may include biographical information about a character in media content 101. During a scene that includes the character, the biographical information about the character may be displayed on the screen. In some implementations, supplemental information 103 may be displayed on display 195 while media content 101 is also displayed on display 195.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code;
a hardware processor configured to execute the executable code to:
receive a media content;
divide the media content into a plurality of shots, each of the plurality of shots including a plurality of frames of the media content, wherein the media content is divided into the plurality of shots based on a first similarity between the plurality of frames, and wherein the first similarity between the plurality of frames of each of the plurality of shots is one of a same character, a same setting, a same style, or a same theme;
determine a plurality of sequential shots of the plurality of shots to form a first sub-scene; and
identify each of the plurality of sequential shots with a corresponding beginning time code and a corresponding ending time code, wherein the beginning time code of a first shot in the plurality of sequential shots corresponds to a beginning time code of the first sub-scene, and the ending time code of a final shot in the plurality of sequential shots corresponds to an ending time code of the first sub-scene.

2. The system of claim 1, wherein the hardware processor is further configured to execute the executable code to:
determine a second plurality of sequential shots of the plurality of shots to form a second sub-scene;
identify each of the second plurality of sequential shots with a corresponding beginning time code and a corresponding ending time code, wherein the beginning time code of a first shot in the second plurality of sequential shots corresponds to a beginning time code of the second sub-scene, and the ending time code of a final shot in the second plurality of sequential shots corresponds to an ending time code of the second sub-scene.

3. The system of claim 2, wherein a scene comprises a plurality of sequential sub-scenes, the first sub-scene is first in an order of the plurality of sequential sub-scenes, and the second sub-scene is last in the order of the plurality of sequential sub-scenes, and
wherein the hardware processor is further configured to execute the executable code to:
identify the scene with a beginning scene time code and an ending scene time code, the beginning scene time code corresponding to the beginning time code of the first sub-scene and the ending scene time code corresponding to the ending time code of the second sub-scene.

4. The system of claim 2, wherein a scene comprises a plurality of sequential sub-scenes, the first sub-scene is first in an order of the plurality of sequential sub-scenes, and the second sub-scene immediately follows the first sub-scene in the order of the plurality of sequential sub-scenes, and
wherein the hardware processor is further configured to execute the executable code to:
insert a transition between the first sub-scene and the second sub-scene.

5. The system of claim 4, wherein the transition is a commercial.

6. The system of claim 1, wherein the hardware processor is further configured to execute the executable code to:
transmit one or more shots of the plurality of sequential shots for displaying on a display.

7. The system of claim 6, wherein the hardware processor is further configured to execute the executable code to:
transmit supplemental content related to the one or more shots of the plurality of sequential shots, wherein the supplemental content and the one or more shots of the plurality of sequential shots are configured to be displayed concurrently on the display.

8. The system of claim 1, wherein the first similarity is determined using at least one of an edit decision list or metadata content.

9. The system of claim 1, wherein the first similarity is one of the same character, the same setting, or the same style, and wherein the first similarity is determined using computer vision.

10. The system of claim 1, wherein a scene comprises a plurality of sub-scenes including the first sub-scene, and wherein the first sub-scene provides context for at least one of a preceding sub-scene or a succeeding sub-scene of the scene.

11. A method for use with a system comprising a hardware processor, the method comprising:
receiving, using the hardware processor, a media content;
dividing, using the hardware processor, the media content into a plurality of shots, each of the plurality of shots including a plurality of frames of the media content, wherein the media content is divided into the plurality of shots based on a first similarity between the plurality of frames, and wherein the first similarity between the plurality of frames of each of the plurality of shots is one of a same character, a same setting, a same style, or a same theme;
determining, using the hardware processor, a plurality of sequential shots of the plurality of shots to form a first sub-scene; and
identifying, using the hardware processor, each of the plurality of sequential shots with a corresponding beginning time code and a corresponding ending time code, wherein the beginning time code of a first shot in the plurality of sequential shots corresponds to a beginning time code of the first sub-scene, and the ending time code of a final shot in the plurality of sequential shots corresponds to an ending time code of the first sub-scene.

12. The method of claim 11, further comprising:
determining, using the hardware processor, a second plurality of sequential shots of the plurality of shots to form a second sub-scene;
identifying, using the hardware processor, each of the second plurality of sequential shots with a corresponding beginning time code and a corresponding ending time code, wherein the beginning time code of a first shot in the second plurality of sequential shots corresponds to a beginning time code of the second sub-scene, and the ending time code of a final shot in the second plurality of sequential shots corresponds to an ending time code of the second sub-scene.

13. The method of claim 12, wherein a scene comprises a plurality of sequential sub-scenes, the first sub-scene is first in an order of the plurality of sequential sub-scenes, and the second sub-scene is last in the order of the plurality of sequential sub-scenes, the method further comprising:
identifying, using the hardware processor, the scene with a beginning scene time code and an ending scene time code, the beginning scene time code corresponding to the beginning time code of the first sub-scene and the ending scene time code corresponding to the ending time code of the second sub-scene.

14. The method of claim 12, wherein a scene comprises a plurality of sequential sub-scenes, the first sub-scene is first in an order of the plurality of sequential sub-scenes, and the second sub-scene immediately follows the first sub-scene in the order of the plurality of sequential sub-scenes, the method further comprising:
  inserting, using the hardware processor, a transition between the first sub-scene and the second sub-scene.

15. The method of claim 14, wherein the transition is a commercial.

16. The method of claim 11, further comprising:
  transmitting, using the hardware processor, one or more shots of the plurality of sequential shots for displaying on a display.

17. The method of claim 16, further comprising:
  transmitting, using the hardware processor, supplemental content related to the one or more shots of the plurality of sequential shots, wherein the supplemental content and the one or more shots of the plurality of sequential shots are configured to be displayed concurrently on the display.

18. The method of claim 11, wherein the first similarity is determined using at least one of an edit decision list or metadata content.

19. The method of claim 11, wherein the first similarity is one of the same character, the same setting, or the same style, and wherein the first similarity is determined using computer vision.

20. The method of claim 11, wherein a scene comprises a plurality of sub-scenes including the first sub-scene, and wherein the first sub-scene provides context for at least one of a preceding sub-scene or a succeeding sub-scene of the scene.

* * * * *